US006834910B2

(12) United States Patent  
Wendland et al.

(10) Patent No.: US 6,834,910 B2  
(45) Date of Patent: Dec. 28, 2004

(54) Y-REAR BRACE FOR INCREASING THE BENDING AND TORSIONAL RIGIDITY OF A BASE CHASSIS

(75) Inventors: Norbert Wendland, Munich (DE); Nikolaus Oancea, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 10/275,767
(22) PCT Filed: May 5, 2001
(86) PCT No.: PCT/EP01/05106
§ 371 (c)(1),
(2), (4) Date: May 21, 2003
(87) PCT Pub. No.: WO01/85528
PCT Pub. Date: Nov. 15, 2001

(65) Prior Publication Data
US 2003/0173799 A1 Sep. 18, 2003

(30) Foreign Application Priority Data
May 11, 2000 (DE) .......................... 100 23 110

(51) Int. Cl.[7] .................... B62D 23/00; B62E 25/20
(52) U.S. Cl. ..................... 296/187.01; 296/203.04
(58) Field of Search ............ 296/187.01, 203.04, 296/187.03, 187.08, 30, 187.11, 204.29, 193.07, 193.08, 193.01, 203.01, 204, 185

(56) References Cited
U.S. PATENT DOCUMENTS 3,761,108 A * 9/1973 Hemmings ............... 296/29
4,729,156 A * 3/1988 Norris, Jr. et al. .......... 296/204
4,899,843 A * 2/1990 Takano et al. .......... 296/187.09
5,074,587 A    12/1991 Schwede et al.
5,228,741 A    7/1993 Ide
5,466,005 A * 11/1995 Kohlmeier et al. ......... 296/204
5,577,760 A * 11/1996 Pressler ..................... 296/204
5,611,593 A *  3/1997 Fukagawa et al. .......... 296/204
5,797,647 A *  8/1998 Mehrkens et al. .......... 296/204
5,803,533 A *  9/1998 Schulz et al. ............... 296/204
6,053,566 A *  4/2000 Aghssa et al. .......... 296/203.01
6,206,460 B1 * 3/2001 Seeliger et al. ............ 296/204
6,206,461 B1 * 3/2001 Gaiser ........................ 296/204
6,270,153 B1 * 8/2001 Toyao et al. ................ 296/204
6,588,832 B2 * 7/2003 Sakuma ..................... 296/204

FOREIGN PATENT DOCUMENTS

DE    4244216 C2    5/1996
DE    19829432 A1   1/2000
EP    0803383 A2   10/1997

* cited by examiner

Primary Examiner—D. Glenn Dayoan
Assistant Examiner—Greg Blankenship
(74) Attorney, Agent, or Firm—Crowell & Moring LLP

(57) ABSTRACT

A bending and torsionally stiff Y-rear brace for a body structure includes a rear cross support, running across the longitudinal direction of the body structure, a support running along the longitudinal direction of the body structure, a connector bracket and two compression and tension brace between the connector bracket and the sill ends. Each brace is supported approximately in the middle thereof on the chassis. A suitable static and dynamic bending and torsional rigidity for vehicles without supporting boot floors is provided.

34 Claims, 4 Drawing Sheets

Y-REAR BRACE FOR INCREASING THE BENDING AND TORSIONAL RIGIDITY OF A BASE CHASSIS

BACKGROUND AND SUMMARY OF THE INVENTION

This invention relates to a Y-shaped rear brace for increasing bending and torsional rigidity of a body structure.

In body structures for motor vehicles, generally, a shear panel, a supporting trunk floor or—if the spare tire is stored in the rear area of the structures—an indentation for the spare tire is incorporated in the rear area; each such element forms a supporting component that is arranged between the cross support, the rear cross support and the right and left longitudinal supports.

If, for design considerations, e.g. for weight reduction purposes, the shear panel or the trunk floor are eliminated, or if the indentation for the spare tire or the trunk floor is to be designed as a non-supporting component, e.g. out of plastic, the static and dynamic bending and torsional rigidity of the vehicle is lost.

It is therefore an object of the present invention to provide sufficient static and dynamic bending and torsional rigidity in a vehicle without a supporting trunk floor.

A Y-shaped rear brace pursuant to the invention offers the advantage that this measure leads to a considerable increase in the static and dynamic bending and torsional rigidity with minimal weight effect.

Due to the features reflected in the dependent claims, beneficial embodiments of the rear brace are possible.

In particular, it is beneficial when the receiving bracket forms a roughly triangular carrier or an alternative receiving design arranged crosswise to the longitudinal direction of the body structure. Such a receiving bracket can be manufactured easily and simply and can be easily incorporated in the body structure, especially when, pursuant to one embodiment, its tip is directed toward the floor of the body structure.

When the cross support and the upper side of the triangular receiving bracket are arranged substantially in one plane, a largely horizontal plane fastening surface, to which e.g. the indentation for the spare tire can be attached, beneficially results.

In order to achieve a high level of rigidity, the support extends from the center of the cross support to the tip of the triangular receiving bracket and finds support in a beam through a tension/compression bar, respectively.

When the two tension or compression bars are supported in the area of the tip of the triangular receiving bracket, the forces that are introduced from the support, which is supported basically in the same area, can be safely distributed throughout the body structure.

To prevent the tension or compression rods from collapsing, they can beneficially find support, especially in their centers, in a support on the body structure.

Further advantages and features of the present invention are described in the following detailed description of examples of a rear brace pursuant to the invention and by referring to the attached drawings.

DETAILED DESCRIPTION OF THE INVENTION

Figure 1:
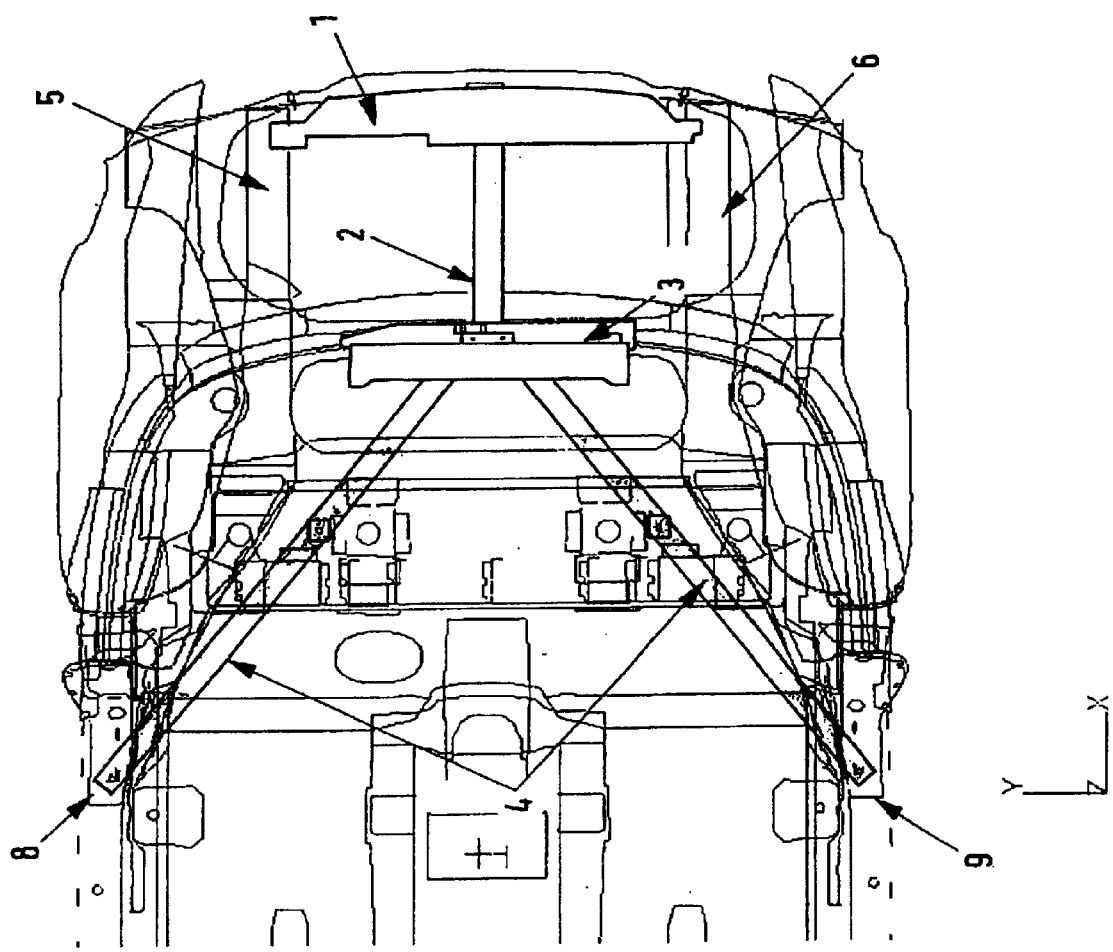
FIG. 1 is a view of a Y-shaped rear brace pursuant to the invention from beneath.
Figure 2:
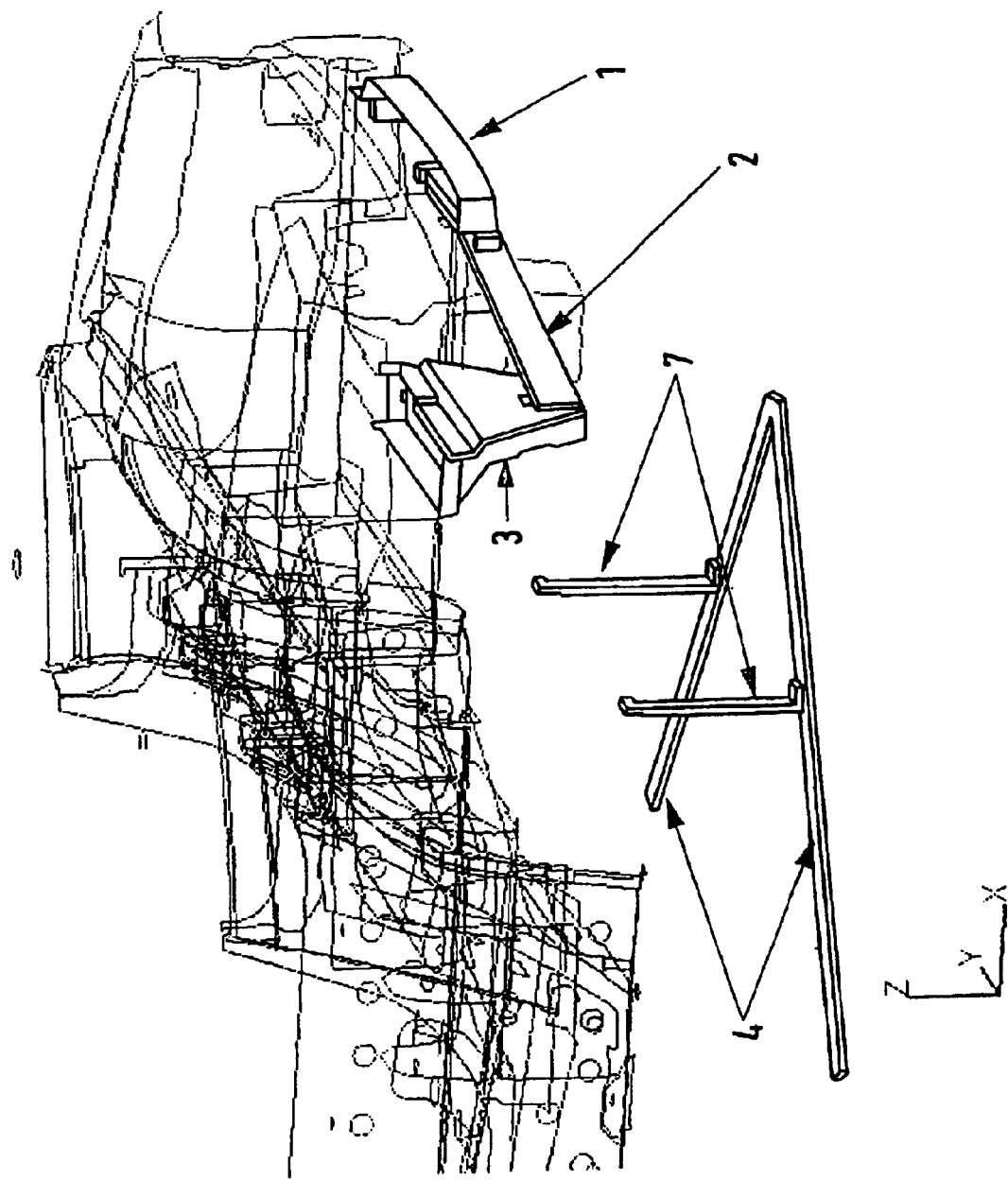
FIG. 2 is a side view of the Y-shaped rear brace pursuant to the invention.
Figure 3:
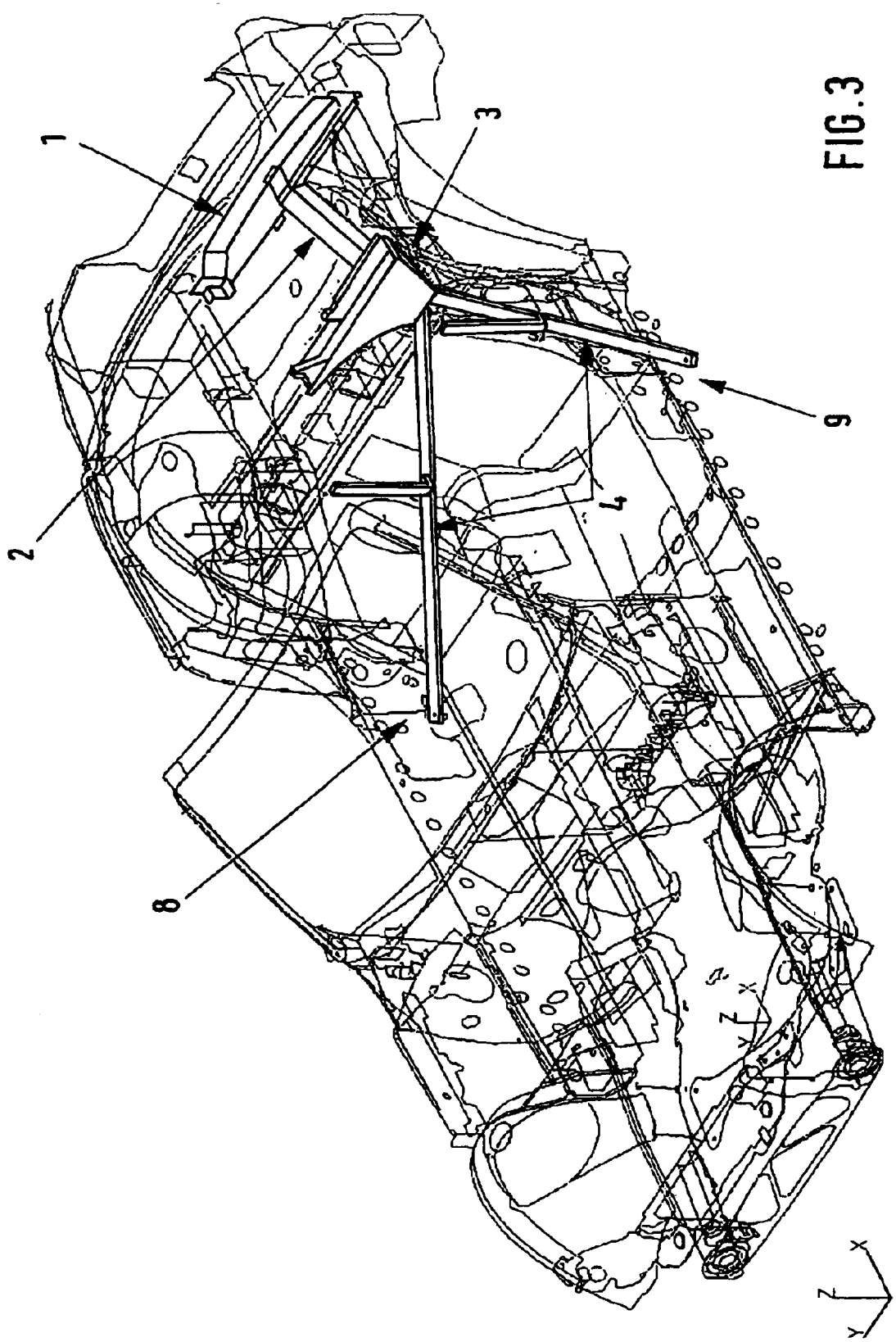
FIG. 3 is a diagonal view of the Y-shaped rear brace pursuant to the invention.

In FIGS. 1 through 3, a rear brace pursuant to the invention is depicted. The figures showed parts of a body structure, which is not shown in further detail, in which a rear brace pursuant to the invention has been installed.

The Y-shaped rear brace has a cross support 1, which is arranged between right and left longitudinal carriers 5, 6 in the rear area of a body structure. A support 2 extends from the cross support 1 in the longitudinal direction of the body structure towards a receiving bracket 3. The support 2 is arranged in the center of the cross support 1.

The receiving bracket 3 is formed by a substantially triangular carrier, which is crosswise to the longitudinal direction of the body structure and the tip of which extends downward in the direction of the road. The cross support 1 and the upper side of the triangular receiving bracket 3 are arranged basically in one plane. This results in a substantially horizontal, even plane, to which e.g. the indentation for receiving a spare tire can be attached.

The support 2 fastened to the cross support 1 extends from the center of the cross support 1 to the tip of the triangular receiving bracket 3 and is thus included in relation to a horizontal line since the tip of the receiving bracket 3 is located lower than the cross support 1.

To achieve a high level of torsional rigidity, the receiving bracket 3 is support by respective tension/compression bars 4 on beams 8, 9. The tension and compression bars 4 are supported in the area of the tip of the triangular receiving bracket 3 so that a cross-force can be introduced as a resulting force to the tensile and compression forces in the receiving bracket.

Additionally, each compression bar 4 is supported by the body structure, especially in its center, by a support 7 to prevent the compression bars 4 from collapsing.

Figure 4:
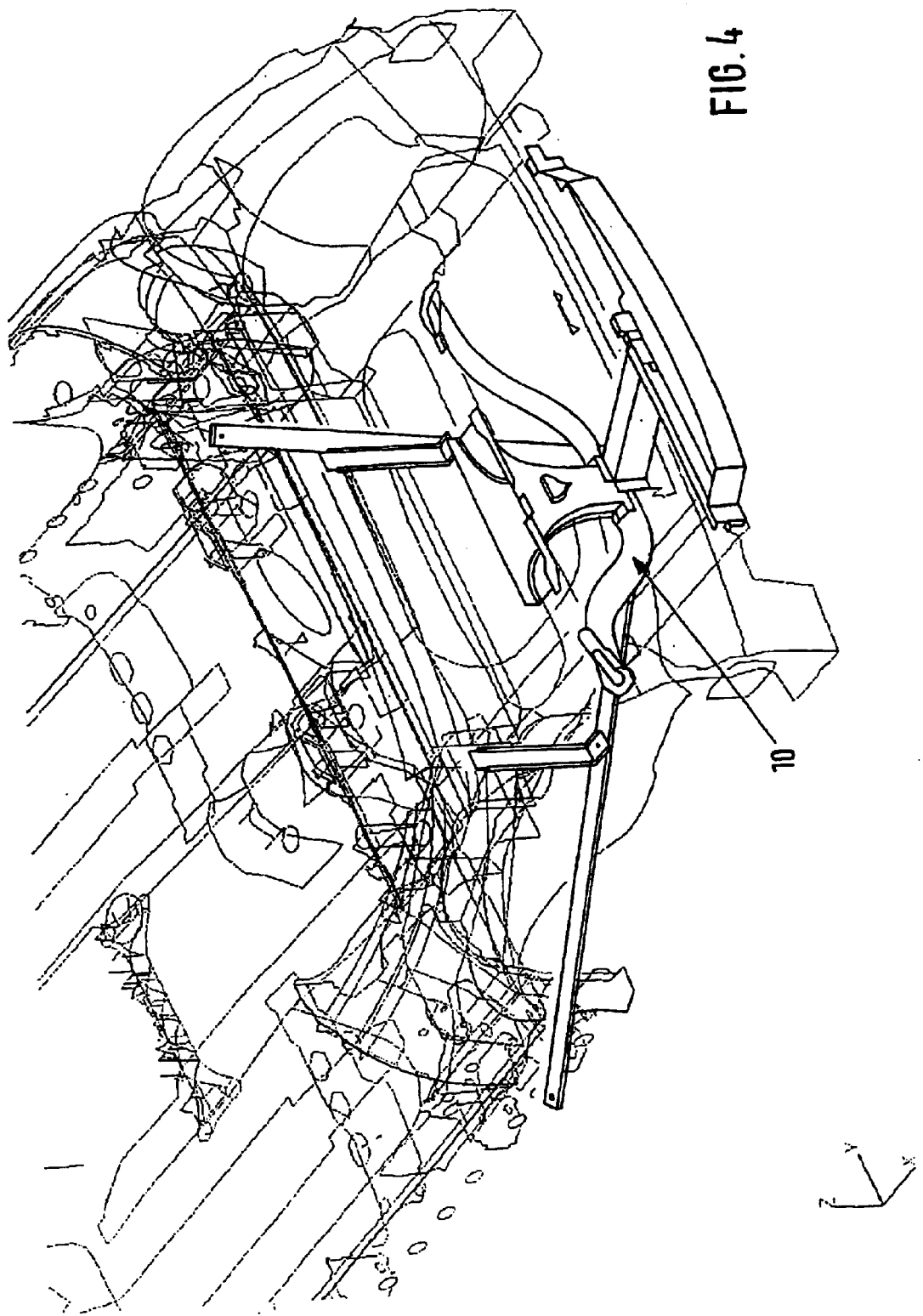
FIG. 4 is a detailed view of an alternative receiving design.

FIG. 4 shows a detailed view of an alternative receiving design 10.

The preceding description of examples pursuant to the present invention serves only illustration purposes and not the purpose of limiting the invention. Within the framework of the invention, various modifications and changes are possible without leaving the scope of the invention as well as its equivalents.

What is claimed is:

1. A Y-shaped rear brace that is resistant to bending and torsion for a body structure comprising:
   a cross support running crosswise to a longitudinal direction of the body structure,
   a support running in the longitudinal direction of the body structure,
   a receiving bracket, and
   two tension/compression bars, each of said tension/compression bars extending from the receiving bracket to one of a pair of beams on lateral sides of the body structure and being supported roughly in its center by the body structure.

2. The Y-shaped rear brace according to claim 1, wherein the receiving bracket is a roughly triangular carrier, which is arranged crosswise to the longitudinal direction of the body structure.

3. The Y-shaped rear brace according to claim 2, wherein the receiving bracket has a tip which points downwardly.

4. The Y-shaped rear brace according to claim 3, wherein the cross support and an upper side of the roughly triangular carrier are arranged basically in one plane.

5. The Y-shaped rear brace according to claim 4, wherein the support running in the longitudinal direction runs from the center of the cross support to the tip of the receiving bracket.

6. The Y-shaped rear brace according to claim 5, wherein the two tension/compression bars are supported at the tip of the receiving bracket.

7. The Y-shaped rear brace according to claim 1, wherein each tension/compression bar is supported by the body structure by way of a support adapted to prevent the tension/compression bar from collapsing which extends from that tension/compression bar.

8. The Y-shaped rear brace according to claim 1, wherein the cross support and an upper side of the receiving bracket are arranged basically in one plane.

9. The Y-shaped rear brace according to claim 2, wherein the cross support and an upper side of the roughly triangular carrier are arranged basically in one plane.

10. The Y-shaped rear brace according to claim 2, wherein each tension/compression bar is supported by the body structure by way of a support adapted to prevent the tension/compression bar from collapsing which extends from that tension/compression bar.

11. The Y-shaped rear brace according to claim 3, wherein each tension/compression bar is supported by the body structure by way of a support adapted to prevent the tension/compression bar from collapsing which extends from that tension/compression bar.

12. The Y-shaped rear brace according to claim 4, wherein each tension/compression bar is supported by the body structure by way of a support adapted to prevent the tension/compression bar from collapsing which extends from that tension/compression bar.

13. The Y-shaped rear brace according to claim 5, wherein each tension/compression bar is supported by the body structure by way of a support adapted to prevent the tension/compression bar from collapsing which extends from that tension/compression bar.

14. The Y-shaped rear brace according to claim 6, wherein each tension/compression bar is supported by the body structure by way of a support adapted to prevent the tension/compression bar from collapsing which extends from that tension/compression bar.

15. The Y-shaped rear brace according to claim 1, wherein the body structure includes a trunk floor.

16. The Y-shaped rear brace according to claim 7, wherein the support extends roughly from the center of the tension/compression bar.

17. The Y-shaped rear brace according to claim 10, wherein the support extends roughly from the center of the tension/compression bar.

18. The Y-shaped rear brace according to claim 11, wherein the support extends roughly from the center of the tension/compression bar.

19. The Y-shaped rear brace according to claim 12, wherein the support extends roughly from the center of the tension/compression bar.

20. The Y-shaped rear brace according to claim 13, wherein the support extends roughly from the center of the tension/compression bar.

21. The Y-shaped rear brace according to claim 14, wherein the support extends roughly from the center of the tension/compression bar.

22. The Y-shaped rear brace according to claim 1, wherein the receiving bracket is situated on or designed as a crossbar by which transverse forces may be introduced into the body structure.

23. A Y-shaped rear brace that is resistant to bending and torsion for a body structure comprising:
    a cross support running crosswise to a longitudinal direction of the body structure,
    a support running in the longitudinal direction of the body structure,
    a receiving bracket, and
    two tension/compression bars, each of said tension/compression bars extending from the receiving bracket to one of a pair of beams on lateral sides of the body structure and being supported by the receiving bracket and said one of said pair of beams, each of said tension/compression bars being additionally supported, between ends thereof, by way of the body structure.

24. The Y-shaped rear brace according to claim 23, wherein the receiving bracket is a roughly triangular carrier, which is arranged crosswise to the longitudinal direction of the body structure.

25. The Y-shaped rear brace according to claim 24, wherein the receiving bracket has a tip which points downwardly.

26. The Y-shaped rear brace according to claim 25, wherein the cross support and an upper side of the roughly triangular carrier are arranged basically in one plane.

27. The Y-shaped rear brace according to claim 26, wherein the support running in the longitudinal direction runs from the center of the cross support to the tip of the receiving bracket.

28. The Y-shaped rear brace according to claim 27, wherein the two tension/compression bars are supported at the tip of the receiving bracket.

29. The Y-shaped rear brace according to claim 23, wherein each tension/compression bar is supported by the body structure by way of a support adapted to prevent the tension/compression bar from collapsing which extends from that tension/compression bar.

30. The Y-shaped rear brace according to claim 23, wherein the cross support and an upper side of the receiving bracket are arranged basically in one plane.

31. The Y-shaped rear brace according to claim 24, wherein the cross support and an upper side of the roughly triangular carrier are arranged basically in one plane.

32. The Y-shaped rear brace according to claim 29, wherein the support extends roughly from the center of the tension/compression bar.

33. The Y-shaped rear brace according to claim 23, wherein the receiving bracket is situated on or designed as a crossbar by which transverse forces may be introduced into the body structure.

34. The Y-shaped rear brace according to claim 23, wherein the body structure includes a trunk floor.

* * * * *